United States Patent
Millerschone

(10) Patent No.: US 7,785,187 B2
(45) Date of Patent: *Aug. 31, 2010

(54) METHOD FOR DISPLAYING AN INTERACTIVE GAME HAVING A PREDETERMINED OUTCOME

(75) Inventor: Norman H. Millerschone, Fort Calhoun, NE (US)

(73) Assignee: IGT, Reno, NV (US)

( * ) Notice: Subject to any disclaimer, the term of this patent is extended or adjusted under 35 U.S.C. 154(b) by 259 days.

This patent is subject to a terminal disclaimer.

(21) Appl. No.: 12/142,337

(22) Filed: Jun. 19, 2008

(65) Prior Publication Data
US 2008/0254847 A1 Oct. 16, 2008

Related U.S. Application Data

(63) Continuation of application No. 10/846,448, filed on May 14, 2004, now Pat. No. 7,393,276, which is a continuation of application No. 10/829,578, filed on Apr. 22, 2004, now Pat. No. 7,390,258, which is a continuation of application No. 09/706,293, filed on Nov. 3, 2000, now Pat. No. 6,729,961.

(51) Int. Cl.
  *A63F 9/24* (2006.01)
(52) U.S. Cl. .............................. 463/17; 463/9; 463/12; 463/13; 463/20; 273/269
(58) Field of Classification Search ........................ None
See application file for complete search history.

(56) References Cited

U.S. PATENT DOCUMENTS

| | | | |
|---|---|---|---|
| 4,157,829 A | 6/1979 | Goldman et al. | |
| 4,332,389 A | 6/1982 | Loyd et al. | |
| 4,335,809 A | 6/1982 | Wain | |
| 4,339,798 A | 7/1982 | Hedges et al. | |
| 4,365,810 A | 12/1982 | Richardson | |
| 4,373,726 A | 2/1983 | Churchill et al. | |
| 4,448,419 A | 5/1984 | Telnaes | |
| 4,455,025 A | 6/1984 | Itkis | |
| 4,467,424 A | 8/1984 | Hedges et al. | |

(Continued)

OTHER PUBLICATIONS

Diamonopoly Advertisement by International Gamco, Inc., published 2002.

(Continued)

*Primary Examiner*—M. Sager
(74) *Attorney, Agent, or Firm*—K&L Gates LLP

(57) ABSTRACT

An interactive game having a pre-determined outcome (e.g., a game of finite poker) that displays an initial hand of cards, receives a player-specified designation as to which cards are to held and which are to be discarded, and then displays an intermediate hand generated in accordance with the player-specified designation. Then a final hand is shown, and in those cases where the player-specified designation (Hold/Discard) is inconsistent with a transition from the intermediate hand to the final hand, an entertaining display is shown, such as a sequence of alternative playing cards. In some cases, the initial hand is a winning hand according to a predetermined payout schedule, and the final hand is a winning hand with a higher payout than the initial hand according to the same payout schedule. The disclosed methods can be used with other games, including reel-type games.

17 Claims, 7 Drawing Sheets

U.S. PATENT DOCUMENTS

| | | | |
|---|---|---|---|
| 4,494,197 A | 1/1985 | Troy et al. | |
| 4,527,798 A | 7/1985 | Siekierski et al. | |
| 4,582,324 A | 4/1986 | Koza et al. | |
| 4,624,462 A | 11/1986 | Itkis | |
| 4,636,951 A | 1/1987 | Harlick | |
| 4,652,998 A | 3/1987 | Koza et al. | |
| 4,669,730 A | 6/1987 | Small | |
| 4,679,143 A | 7/1987 | Hagiwara | |
| 4,689,742 A | 8/1987 | Troy et al. | |
| 4,798,387 A | 1/1989 | Richardson | |
| 4,805,907 A | 2/1989 | Hagiwara | |
| 4,815,741 A | 3/1989 | Small | |
| 4,817,951 A | 4/1989 | Crouch et al. | |
| 4,842,278 A | 6/1989 | Markowicz | |
| 4,848,771 A | 7/1989 | Richardson | |
| 4,856,787 A | 8/1989 | Itkis | |
| 4,880,237 A | 11/1989 | Kishishita | |
| 4,882,473 A | 11/1989 | Bergeron et al. | |
| 5,007,649 A | 4/1991 | Richardson | |
| 5,042,809 A | 8/1991 | Richardson | |
| 5,092,598 A | 3/1992 | Kamille | |
| 5,119,295 A | 6/1992 | Kapur | |
| 5,158,293 A | 10/1992 | Mullins | |
| 5,223,698 A | 6/1993 | Kapur | |
| 5,265,874 A | 11/1993 | Dickinson et al. | |
| 5,275,400 A | 1/1994 | Weingardt et al. | |
| 5,276,312 A | 1/1994 | McCarthy | |
| 5,282,620 A | 2/1994 | Keesee | |
| 5,297,802 A | 3/1994 | Pocock et al. | |
| 5,324,035 A | 6/1994 | Morris et al. | |
| 5,326,104 A | 7/1994 | Pease et al. | |
| 5,348,299 A | 9/1994 | Clapper, Jr. | |
| 5,351,970 A | 10/1994 | Fioretti | |
| 5,377,975 A | 1/1995 | Clapper, Jr. | |
| 5,393,061 A | 2/1995 | Manship et al. | |
| 5,398,932 A | 3/1995 | Eberhardt et al. | |
| 5,407,199 A | 4/1995 | Gumina | |
| 5,476,259 A | 12/1995 | Weingardt | |
| 5,487,544 A | 1/1996 | Clapper, Jr. | |
| 5,536,008 A | 7/1996 | Clapper, Jr. | |
| 5,542,669 A | 8/1996 | Charron et al. | |
| 5,562,284 A | 10/1996 | Stevens | |
| 5,564,701 A | 10/1996 | Dettor | |
| 5,580,311 A | 12/1996 | Haste, III | |
| 5,595,538 A | 1/1997 | Haste, III | |
| 5,609,337 A | 3/1997 | Clapper, Jr. | |
| 5,628,684 A | 5/1997 | Bouedec | |
| 5,630,754 A | 5/1997 | Rebane | |
| 5,645,485 A | 7/1997 | Clapper, Jr. | |
| 5,657,899 A | 8/1997 | Stoken | |
| 5,674,128 A | 10/1997 | Holch et al. | |
| 5,697,843 A | 12/1997 | Manship et al. | |
| 5,720,483 A | 2/1998 | Trinh | |
| 5,735,432 A | 4/1998 | Stoken et al. | |
| 5,749,784 A | 5/1998 | Clapper, Jr. | |
| 5,779,545 A | 7/1998 | Berg et al. | |
| 5,779,547 A | 7/1998 | SoRelle et al. | |
| 5,800,269 A | 9/1998 | Holch et al. | |
| 5,810,664 A | 9/1998 | Clapper, Jr. | |
| 5,830,067 A | 11/1998 | Graves et al. | |
| 5,855,515 A | 1/1999 | Pease et al. | |
| 5,871,398 A | 2/1999 | Schneier et al. | |
| 5,876,283 A | 3/1999 | Parra et al. | |
| 5,882,260 A | 3/1999 | Marks et al. | |
| 5,915,588 A | 6/1999 | Stoken et al. | |
| 5,928,082 A | 7/1999 | Clapper, Jr. | |
| 5,941,771 A | 8/1999 | Haste, III | |
| 5,944,606 A | 8/1999 | Gerow | |
| 5,949,042 A | 9/1999 | Dietz, II et al. | |
| 5,954,582 A | 9/1999 | Zach | |
| 5,980,385 A | 11/1999 | Clapper, Jr. | |
| 5,984,779 A | 11/1999 | Bridgeman et al. | |
| 6,012,984 A | 1/2000 | Roseman | |
| 6,017,032 A | 1/2000 | Grippo et al. | |
| 6,024,640 A | 2/2000 | Walker et al. | |
| 6,056,289 A | 5/2000 | Clapper, Jr. | |
| 6,062,981 A | 5/2000 | Luciano, Jr. | |
| 6,089,982 A | 7/2000 | Holch et al. | |
| 6,093,100 A | 7/2000 | Singer et al. | |
| 6,120,024 A | 9/2000 | Lind | |
| 6,146,272 A | 11/2000 | Walker et al. | |
| 6,155,925 A | 12/2000 | Giobbi et al. | |
| 6,159,095 A | 12/2000 | Frohm et al. | |
| 6,168,521 B1 | 1/2001 | Luciano et al. | |
| 6,174,233 B1 | 1/2001 | Sunaga et al. | |
| 6,183,361 B1 | 2/2001 | Cummings et al. | |
| 6,190,255 B1 | 2/2001 | Thomas et al. | |
| 6,210,275 B1 | 4/2001 | Olsen | |
| 6,210,276 B1 | 4/2001 | Mullins | |
| 6,217,448 B1 | 4/2001 | Olsen | |
| 6,220,961 B1 | 4/2001 | Keane et al. | |
| 6,241,606 B1 | 6/2001 | Riendeau et al. | |
| 6,254,480 B1 | 7/2001 | Zach | |
| 6,273,820 B1 | 8/2001 | Haste, III | |
| 6,280,325 B1 | 8/2001 | Fisk | |
| 6,280,328 B1 | 8/2001 | Holch et al. | |
| 6,302,791 B1 | 10/2001 | Frohm et al. | |
| 6,306,038 B1 | 10/2001 | Graves et al. | |
| 6,309,298 B1 | 10/2001 | Gerow | |
| 6,315,289 B1 | 11/2001 | Sakamoto et al. | |
| 6,325,716 B1 | 12/2001 | Walker et al. | |
| 6,358,150 B1 | 3/2002 | Mir et al. | |
| 6,358,151 B1 | 3/2002 | Enzminger et al. | |
| 6,368,218 B2 | 4/2002 | Angell, Jr. | |
| 6,386,977 B1 | 5/2002 | Hole | |
| 6,402,614 B1 | 6/2002 | Schneier et al. | |
| 6,419,583 B1 | 7/2002 | Crumby et al. | |
| 6,447,395 B1 | 9/2002 | Stevens | |
| 6,450,885 B2 | 9/2002 | Schneier et al. | |
| 6,454,648 B1 | 9/2002 | Kelly et al. | |
| RE37,885 E | 10/2002 | Acres et al. | |
| 6,471,591 B1 | 10/2002 | Crumby | |
| 6,475,086 B2 | 11/2002 | Zach | |
| 6,508,711 B1 | 1/2003 | Ono | |
| 6,524,184 B1 | 2/2003 | Lind et al. | |
| 6,524,185 B2 | 2/2003 | Lind | |
| 6,527,638 B1 | 3/2003 | Walker et al. | |
| 6,533,664 B1 | 3/2003 | Crumby | |
| 6,537,150 B1 | 3/2003 | Luciano et al. | |
| 6,599,187 B2 | 7/2003 | Gerow | |
| 6,656,040 B1 | 12/2003 | Brosnan et al. | |
| 6,656,044 B1 | 12/2003 | Lewis | |
| 6,729,961 B1 * | 5/2004 | Millerschone | 463/30 |
| 7,387,568 B2 * | 6/2008 | Millerschone | 463/17 |
| 7,390,258 B2 * | 6/2008 | Millerschone | 463/17 |
| 7,393,276 B2 * | 7/2008 | Millerschone | 463/17 |
| 2002/0010013 A1 | 1/2002 | Walker et al. | |
| 2002/0039917 A1 | 4/2002 | Armstrong et al. | |
| 2002/0072404 A1 | 6/2002 | Gerow | |
| 2002/0077173 A1 | 6/2002 | Luciano et al. | |
| 2002/0077174 A1 | 6/2002 | Luciano et al. | |
| 2002/0082070 A1 | 6/2002 | Macke et al. | |
| 2002/0082071 A1 | 6/2002 | Riendeau et al. | |
| 2002/0082085 A1 | 6/2002 | Osterer | |
| 2002/0090986 A1 | 7/2002 | Cote et al. | |
| 2002/0094871 A1 | 7/2002 | Luciano et al. | |
| 2002/0098882 A1 | 7/2002 | Lind et al. | |
| 2002/0098883 A1 | 7/2002 | Packes, Jr. et al. | |
| 2002/0111207 A1 | 8/2002 | Lind et al. | |
| 2002/0111214 A1 | 8/2002 | Lind et al. | |
| 2002/0113369 A1 | 8/2002 | Weingardt | |
| 2002/0132661 A1 | 9/2002 | Lind et al. | |
| 2002/0132666 A1 | 9/2002 | Lind et al. | |
| 2002/0169018 A1 | 11/2002 | Schneier et al. | |

| | | | |
|---|---|---|---|
| 2003/0100371 A1 | 5/2003 | Gatto et al. |
| 2003/0100372 A1 | 5/2003 | Gatto et al. |
| 2003/0125101 A1 | 7/2003 | Campo |
| 2003/0181231 A1 | 9/2003 | Vancura et al. |
| 2003/0211884 A1 | 11/2003 | Gauselmann |
| 2004/0014515 A1 | 1/2004 | Tracy et al. |

OTHER PUBLICATIONS

Electronic Pull Tabs Advertisement by 21$^{st}$ Century Gaming, published prior to 2002.

Lucky Times California Lottery Newsletter published 1996.

Instant Winner Advertisement by Williams/WMS Gaming, published prior to 2002.

Play it again Advertisement by International Gamco, Inc., published 2000.

International Gaming & Wagering Business (IGWB), Mar. 1997, pp. 11-18.

* cited by examiner

FIG. 3

|  | Card 1 | Card 2 | Card 3 | Card 4 | Card 5 |
|---|---|---|---|---|---|
| Hand 1 | 5 Hearts | 6 Hearts | 7 Spades | 8 Hearts | 3 Clubs |
| Hand 2 | 5 Spades | Q Diamonds | 4 Clubs | 8 Spades | 9 Hearts |
| Game-Specified Designation | Ignore | Hold | Hold | Ignore | Discard |

Hand 1

D    H    D    H    H

Intermediate Hand

Final Hand

FIG. 5

|  | Card 1 | Card 2 | Card 3 | Card 4 | Card 5 |
|---|---|---|---|---|---|
| Hand 1 | 5 Hearts | 5 Diamonds | Q Clubs | 8 Spades | 4 Hearts |
| Hand 2 | 7 Hearts | 6 Diamonds | 5 Clubs | 4 Spades | 9 Hearts |
| Game-Specified Designation | Hold | Hold | Discard | Discard | Hold |

Hand 1

Intermediate Hand

Final Hand

FIG. 7

Play Data

| |
|---|
| Hand 1 (bit map, card code, hand code) |
| Hand 2 (bit map, card code, hand code) |
| Game-specified Designation (Hold/Draw/Ignore) |
| Payout |

FIG. 8

Play Data

| |
|---|
| Hand 1 (bit map, card code, hand code) |
| Final Hand (bit map, card code, hand code) | ns
METHOD FOR DISPLAYING AN INTERACTIVE GAME HAVING A PREDETERMINED OUTCOME

PRIORITY CLAIM

This application is a continuation of, claims priority to and the benefit of U.S. patent application Ser. No. 10/846,448, filed on May 14, 2004, which is a continuation application of, claims priority to and the benefit of U.S. patent application Ser. No. 10/829,578, filed on Apr. 22, 2004, which is a continuation application of, claims priority to and the benefit of U.S. patent application Ser. No. 09/706,293, filed on Nov. 3, 2000, the entire contents of which are incorporated herein.

CROSS-REFERENCE TO RELATED APPLICATIONS

This application relates to the following co-pending commonly owned patent applications: "GAMING DEVICE HAVING AN INTERACTIVE POKER GAME WITH PRE-DETERMINED OUTCOMES," Ser. No. 10/934,258; "CENTRAL DETERMINATION POKER GAME," Ser. No. 10/945,642; "GAMING DEVICE HAVING A PREDETERMINED RESULT POKER GAME," Ser. No. 11/031,663; and "STUD BINGO," Ser. No. 11/031,048.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

The present invention relates to interactive games such as finite pool games that have pre-determined outcomes, and in particular to improvements to such games that increase appeal to players.

One class of interactive games is known as finite poker. In a finite poker game, a player is shown a first hand of cards and invited to select one or more cards to be discarded. Then the player is shown a final hand and a payoff is provided if the final hand is a winning hand according to a predetermined payout schedule.

In finite poker games known to the present inventor, the initial hand and the final hand are both predetermined prior to the time the game is started. For this reason, there can often be an inconsistency between the player's selection of cards that are to be discarded and the transition from the initial hand to the final hand. This inconsistency can interfere with the desired simulation of a card game.

The present invention is directed to an improved method for displaying an interactive game that addresses this and other disadvantages of the prior art.

SUMMARY OF THE INVENTION

The preferred card game embodiment described below displays a first hand of cards, accepts a player's designation of cards to be discarded, shows an intermediate hand that would result from the player's hold/discard decisions, and then shows the final hand, predetermined by the particular game that is in progress. In order to improve the transition between the intermediate hand and the final hand, the system described below displays an entertaining display in place of those cards that are changed between the intermediate and the final hand. This entertaining display can take many forms, and in one embodiment takes the form of a sequence of simulated cards. This provides an added dimension of play as the player waits for the entertaining display to terminate, after which time the player learns the final hand and the payout for the game in progress.

The system described below provides the further advantage over the known prior art in that the final hand may provide an increased payout as compared to the first hand, even in those cases where the first hand is a winning hand according to a predetermined payout schedule. Thus, even when the first hand is a winning hand, the final payout may on some occasions be greater than the apparent payout indicated by the first hand. This provides another element of entertainment to the game.

The foregoing paragraphs have been provided by way of general introduction, and they are not intended to narrow the scope of the following claims.

BRIEF DESCRIPTION OF THE DRAWINGS

FIG. 3 is one example of play data that have been read and stored at block 36 of FIG. 2a.

FIG. 5 is a second example of play data that have been read and stored at block 36 of FIG. 2a.

FIGS. 7 and 8 are schematic representations of two alternative forms that the play data can take.

DETAILED DESCRIPTION OF THE INVENTION

Figure 1:
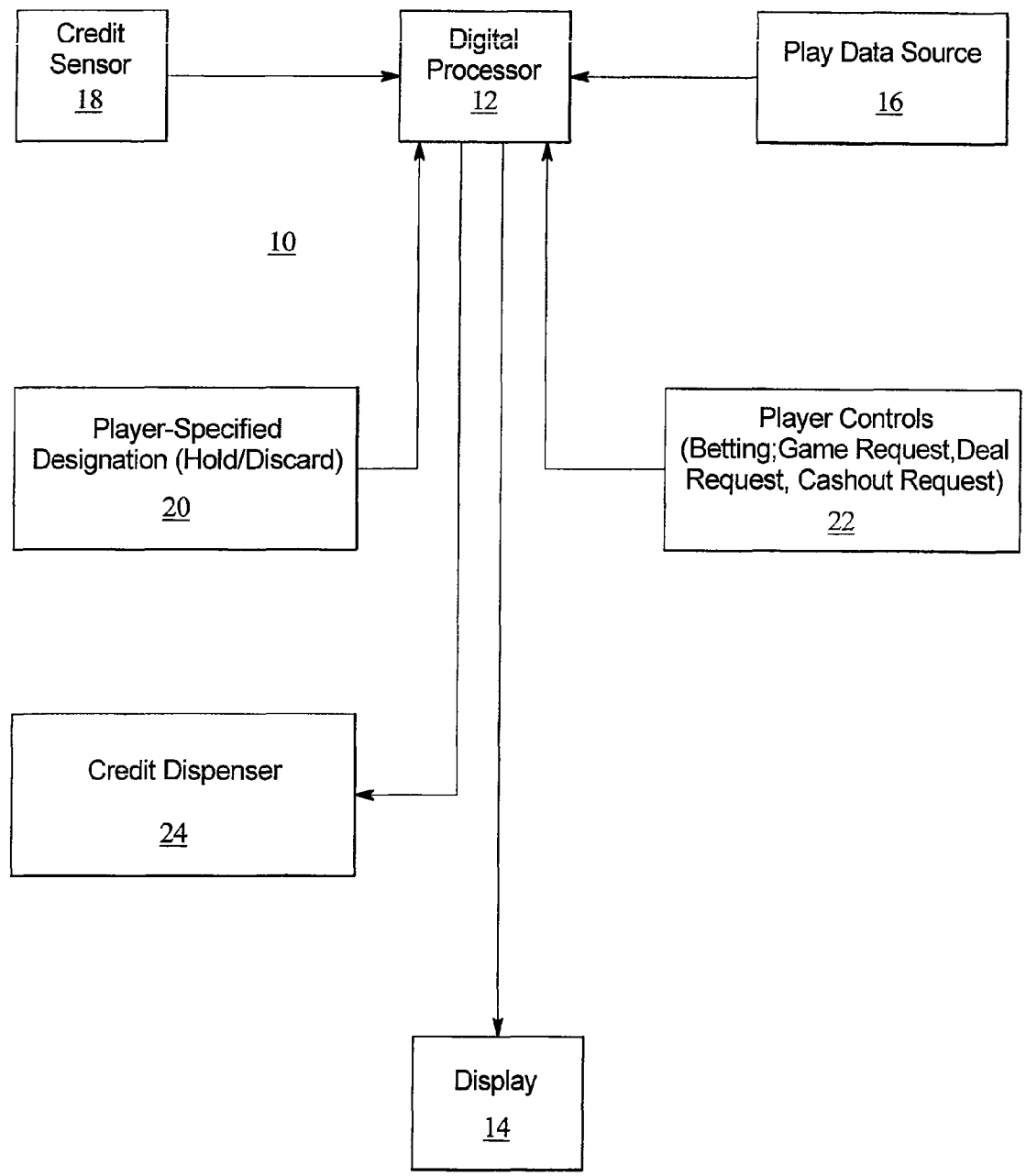
FIG. 1 is a block diagram of a system for displaying a simulated card game.

Turning now to the drawings, FIG. 1 shows a block diagram of a system 10 for displaying an interactive game having a pre-determined outcome, in this example a simulated card game. The system 10 includes a digital processor 12 that may be a conventional computer, including conventional memory devices such as random access memory, read only memory and disk storage devices. The digital processor 12 generates displays that are shown on a display 14, and the processor 12 dispenses credits via a credit dispenser 24. The display 14 can take any suitable form, using any appropriate technology, including cathode ray tubes, liquid crystal displays, and any other display that provides suitable information to the player. The credit dispenser can take many forms depending upon the implementation, and can include a device for issuing a credit to any desired account, a receipt such as a printed receipt, one or more of tokens, coins, or other forms of money.

The digital processor 12 receives input information from the remaining elements of FIG. 1. In particular, the processor 12 receives finite-pool play data from a play data source 16. A finite pool in this context is a set of predetermined game outcomes, including winning outcomes and losing outcomes. Each set of finite-pool play data corresponds to one of the predetermined outcomes of the pool. Once a particular play data set has been received from the play data source, the outcome of the associated simulated game is completely determined. The play data are described by way of example in the following detailed description.

The play data source can take any suitable form and is not intended to be limited to any particular source. For example, the play data source described in Morris U.S. Pat. No. 5,324, 035 has been found suitable, but many alternatives are possible. In a stand-alone system, the play data source 16 may correspond to stored data files on any storage medium, such as a magnetic disk, ROM, CD ROM, RAM, or other memory device.

Other elements for generating input signals for the digital processor 12 include a credit sensor 18 that responds to credits provided to the system 10 by a player. The credits can take many forms, including coins, tokens and debit transactions from any of various accounts, and the credit sensor 18 can take appropriate forms. The player-specified designation device 20 allows a player to designate Hold or Discard for each of the displayed cards, and transfers this player-specified designation to the processor 12. The device 20 can also take many forms, and can for example be implemented as any suitable switch, touch screen, array of switches, or the like. A pointing device such as a mouse or trackball can also be used.

Block 22 indicates additional player controls such as those used by the player to select an amount to be bet in a particular game, a game request switch or button, a deal request switch or button, and a cashout request switch or button. As before, the widest variety of devices can be used to implement these controls, including switch or switch arrays, touch screens, pointing devices such as a mouse or a trackball, and the like.

Various ones of the elements 18-22 are optional. For example, the credit sensor 18, the credit dispenser 24 and the betting controls and the cashout request controls may be deleted in alternative embodiments.

Figure 2A:
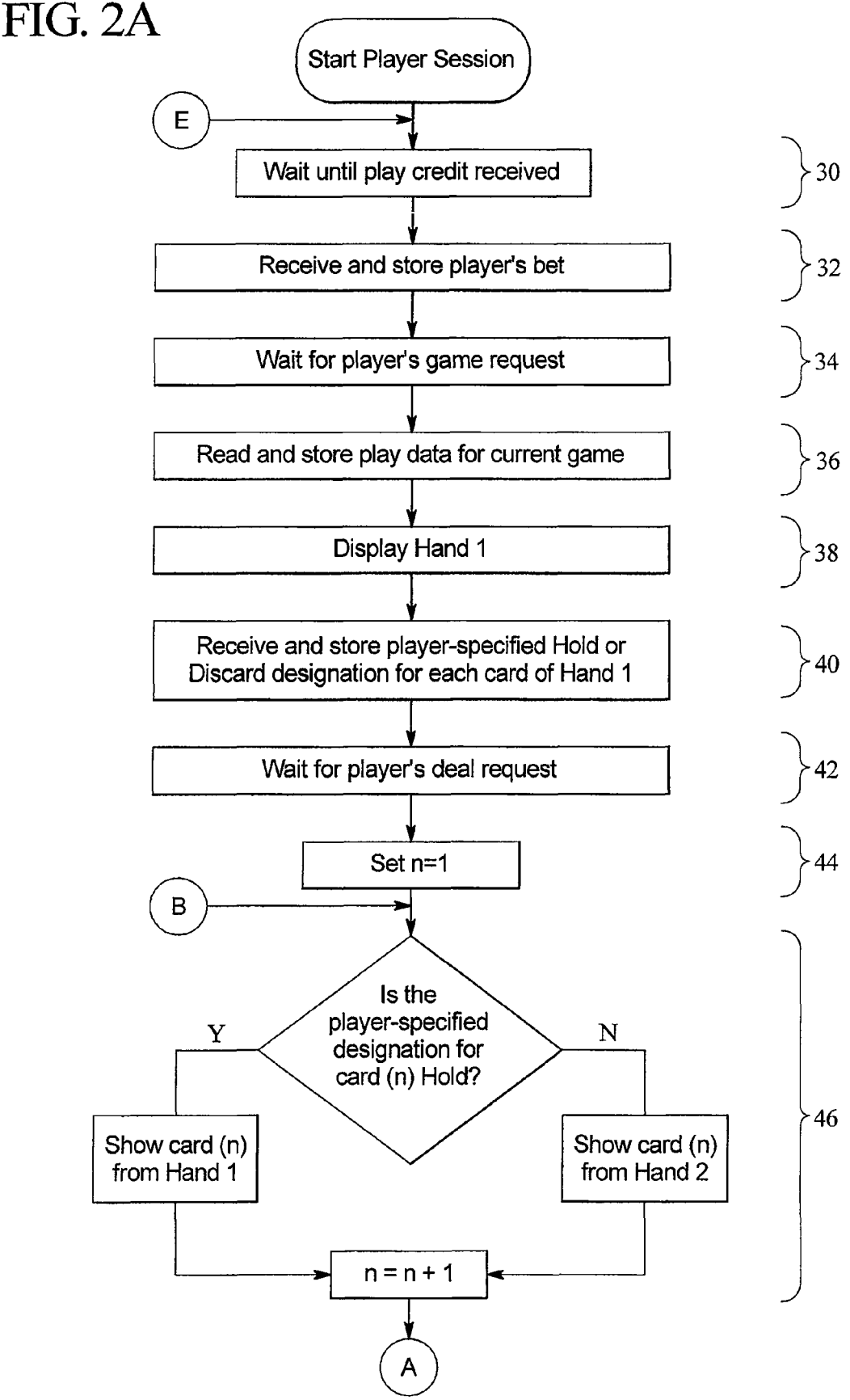
FIGS. 2a, 2b and 2c present a flowchart of a method implemented by the system of FIG. 1.
Figure 2B:
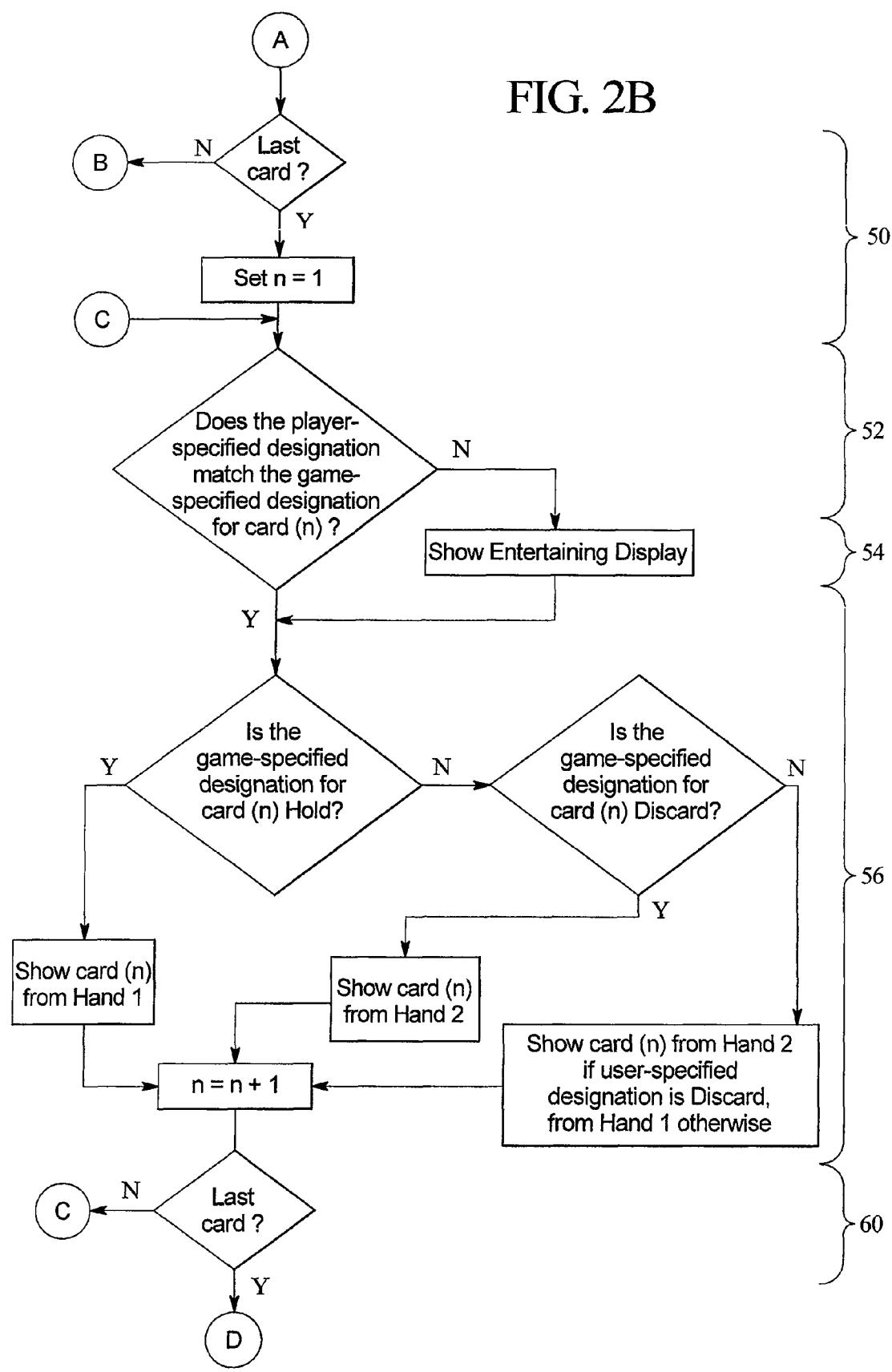
Figure 2C:
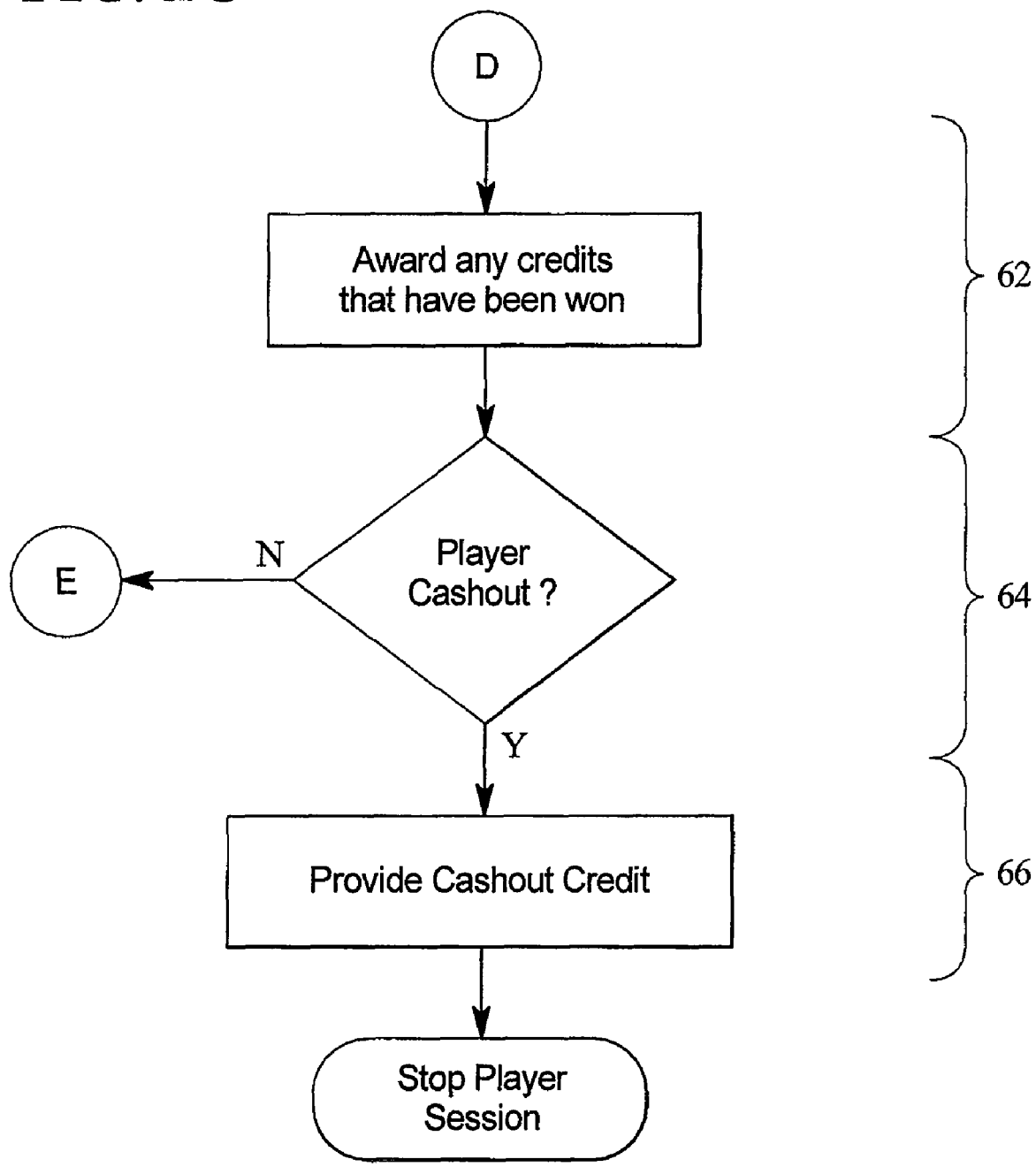

FIGS. 2a through 2c illustrate a method implemented by the system 10 of FIG. 1. The following discussion will first describe the various steps of the method in general terms, and will then provide specific examples of the displays generated by the method of FIGS. 2a through 2c in response to two separate sets of play data.

As shown in FIG. 2a, once a player session has begun the system waits in block 30 until a play credit is received, as indicated by the credit sensor 18 of FIG. 1. The system optionally receives and stores the player's bet for the game at block 32, and then waits for the player's game request at block 34. Once a game request is received, the system 10 reads and stores play data for the current game at block 36. The play data are determined by the game designer before play begins, and cannot be altered by the player or the system 10. Thus, the outcome of each game is pre-determined by the play data.

The play data stored in block 36 can take many forms, depending upon the application. FIGS. 7 and 8 show two alternatives. In the embodiment of FIG. 7, each set of play data defines five playing cards that make up Hand 1 (the initial hand), five playing cards that make up Hand 2 (the draw hand), as well as a game-specified designation for each card and a payout for the game. Hand 1 in this example corresponds to the dealt hand, and Hand 2 corresponds to the cards that will be drawn for each card position after a discard.

The five cards of Hand 1 and the five cards of Hand 2 can be encoded in any desired way in the play data. For example, the cards of each hand can be defined by bitmaps included in the play data that define the desired display on a bit-by-bit basis. Alternatively, the play data can include card codes for each of the cards of Hand 1 and Hand 2, or other types of codes such as a hand code that uniquely identifies the five cards of Hand 1 and other hand code that uniquely identifies the five cards of Hand 2, or a game code that identifies both hands, or keys or indexes into lookup tables. The present invention is not limited to any specific manner for indicating the desired cards of Hand 1 and Hand 2 in the play data, and any approach now known or later discovered can be used.

The game-specified designation of the play data of FIG. 7 includes a parameter for each of the five cards. This parameter has three states: Hold, Discard, Ignore. In the Hold state, the final hand for the corresponding card position will be the corresponding card of Hand 1. When the game-specified designation is Discard, the corresponding card of the final hand will be taken from Hand 2. When the parameter is in the Ignore state, the corresponding card of the final hand will be taken from Hand 1 or Hand 2, in accordance with the player-specified designation (Hold/Discard). The game-specified designations are set by the game designer, and they may not be altered by the player.

Finally, payout information of the play data indicates whether the final hand is a winning hand, and if so, the amount of the payout.

Many other approaches can be used for the play data, and FIG. 8 shows one alternative. In the example of FIG. 8, the play data only includes data defining Hand 1 and the final hand. As explained above, these two hands can be encoded as a bitmap, as a card code, as a hand code, or as a game code. In this case, the play data does not include game-specified designations, and the necessary information is derived by the processor 12 of FIG. 1 by comparing the cards of Hand 1 with the cards of the final hand. Similarly, the play data of FIG. 8 does not include payout information, and the digital processor 12 determines the payout based on the cards of the final hand, as for example with the aid of a lookup table that defines a payout schedule.

Many other approaches are possible, and the play data are not even limited to two-state binary data. Any desired set of cards can be used to encode the information of the play data.

Returning to FIG. 2a, once the play data have been stored in block 36, Hand 1 is displayed in block 38. Any desired format is used to present each of the playing cards of Hand 1 to the player. The playing cards of hand 1 can be taken from any desired deck of cards, and they are not limited to the customary four-suite deck commonly used in poker.

In block 40 the system receives and stores a player-specified designation (Hold or Discard) for each of the cards of Hand 1. Depending upon the rules of the game, the player may be limited in the number of cards that may be discarded. As an optional feature, the play data may include suggested Hold/Discard designations that can be displayed to assist the player in determining which cards to hold and which cards to discard in Hand 1.

When the player has completed the selection of Hold or Discard designations for each card of Hand 1, the player issues a deal request, which is monitored in block 42. When the deal request is received, control is transferred to block 44, where an index parameter n is set equal to 1. In the following discussion the index parameter n will be used to designate which of the cards of a hand is being considered at a given time. By way of example, in a five card poker game, the left-most card in any hand may correspond to card (1) (n=1) and the right-most card in any hand may correspond to card (5) (n=5).

Next, in the group of blocks designated at 46 the system examines card (n) to determine whether the player-specified designation for card (n) is Hold or Discard. If the player-specified designation is Hold, then the system shows card (n) from Hand 1 in an intermediate display. If the player-specified designation for card (n) is Discard, the system shows card (n) from Hand 2 in the intermediate display. The index parameter (n) is then incremented and control is transferred to block 50. In block 50 control is returned to node B until the last card has been updated in the intermediate display.

Thus, the intermediate display shows the hand that would result if the player-specified designations were followed. In this example, the intermediate hand is generated sequentially from left to right, thereby simulating successive cards that are either held or discarded. In an alternative version, all of the actions taken in block 46 can be displayed simultaneously, such that the intermediate hand replaces the first hand all at once as opposed to in a card-by-card fashion.

After the entire intermediate hand has been shown, the index parameter (n) is reset to 1, and the system then examines each of the cards of the intermediate hand to determine in block 52 whether the player-specified designation (Hold/Discard) matches the game-specified designation (Hold/Discard/Ignore) for the card in question. If the two designations match (i.e., both the player-specified designation and the game-specified designation correspond to Hold, or both correspond to Discard, or the game-specified designation corresponds to Ignore for the card in the question), then control is transferred to block 56, where the game-specified designation for the card in question is used to select the card to be shown for the final hand. In particular, if the game-specified designation for card (n) is Hold, then card (n) of the final hand is taken from Hand 1. If the game-specified designation for card (n) is Discard, card (n) for the final hand is taken from Hand 2. If the game-specified designation for card (n) is Ignore, then card (n) for the final hand is taken from Hand 1 or Hand 2 in accordance with the player-specified designation for card (n). Note that the cards of the final hand are selected from Hand 1 and/or Hand 2. Thus, the cards of the final hand can include only cards of Hand 1, only cards of Hand 2, or any desired combination of cards from Hand 1 and Hand 2, depending upon the game being implemented.

Conversely, when the test of block 52 indicates that the player has specified Hold but the game-specified designation is Discard, or that the player has specified Discard but the game-specified designation is Hold, then control is transferred to block 54, where an entertaining display is shown in place of card (n). This entertaining display appears in the location of card (n) for a period of time after the display of card (n) of the intermediate hand in block 46 has been terminated and before display of card (n) of the final hand has been started in block 56. This entertaining display can take many forms, and may for example be a sequence of playing card images flashed in rapid succession, a morphing display in which card (n) of the intermediate display makes a progressive transition to card (n) of the final display, or an animation sequence of images. Other alternatives are possible.

Regardless of the form that the entertaining display takes, it indicates to the player that a different card will be shown in the final hand than in the intermediate hand. It thus provides an element of suspense, and it makes the transition from the intermediate hand to the final hand distinctive for those cards where there will be a transition between the intermediate hand and the final hand.

There is an inevitable tension in an interactive finite-pool game: because the game is interactive, there is the illusion that the player's decisions may improve his or her chances for success; but because the game is a finite-pool game, the game outcome is predetermined by the finite-pool play data. This tension is greatest when the cards of the intermediate hand that result from the player's Hold/Discard decisions are changed to the cards of the final hand. The entertaining display helps to preserve the illusion of game play at this time, and thereby makes the game more entertaining.

Blocks 52 through 56 are executed repeatedly for each of the cards of the intermediate hand until the last card of the final hand has been displayed, as indicated in block 60. In this event, control is transferred to block 62 (FIG. 2*c*), at which time any credits are awarded that have been won. In block 64 the system determines if the player wishes to cash out. If not, control is returned to node E for another game. If so, the system provides a cashout credit in block 66 and stops the session for the individual player. At this point, the system is ready to start another session at node E. As before, the actions of block 56 can be displayed to the player simultaneously for all of the card positions, or sequentially for one card after another as illustrated in the flowchart of FIG. 2*b*.

FIG. 3 provides one example of the play data that is read in block 36 of FIG. 2*a*, and FIGS. 4*a* through 4*e* illustrate the corresponding displays generated by the method of FIGS. 2*a* through 2*c*.

Figure 4A:
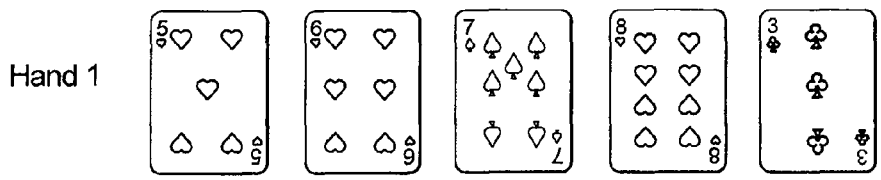
FIGS. 4a through 4e are schematic representations of displays generated by the system of FIG. 1 in response to the play data of FIG. 3.
Figure 4B:
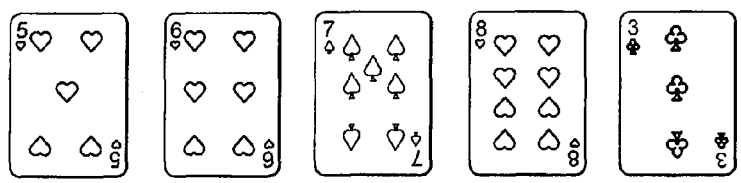

FIG. 4*a* shows Hand 1 as defined by the first line of the play data of FIG. 3, and as displayed in block 38. In this example, the player-specified Hold or Discard designation of block 40 is as shown in FIG. 4*b*. Note that the player has asked that cards 1 and 3 be discarded, and that cards 2, 4 and 5 be held.

Figure 4C:
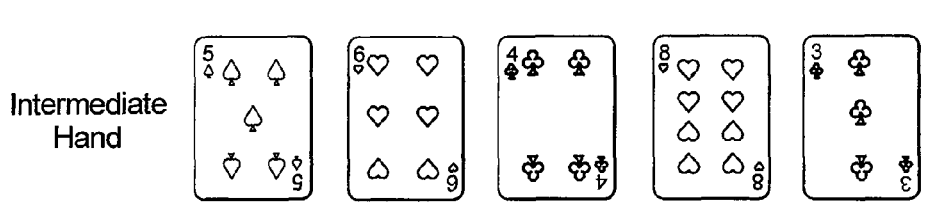

FIG. 4*c* shows the corresponding intermediate hand displayed by block 46. Note that cards 1 and 3 in the intermediate hand of FIG. 4*c* are taken from Hand 2 of the play data of FIG. 3, and that cards 2, 4 and 5 of the intermediate hand are taken from Hand 1, in accordance with the player-specified designations.

Figure 4D:
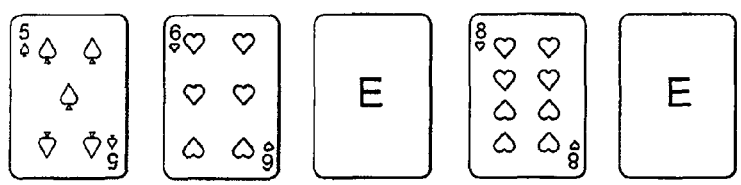
Figure 4E:
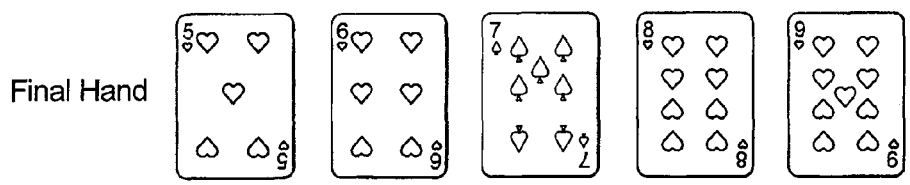

FIG. 4*d* schematically shows that the entertaining display is provided only for cards 3 and 5. FIG. 4*e* shows the final hand, which has been generated in accordance with block 60 of FIG. 2*b*. Note that the final hand of FIG. 4*e* is selected from Hand 1 and Hand 2. In particular, the intermediate hand of FIG. 4*c* corresponds to the final hand of FIG. 4*e* for cards 1, 2 and 4, and no entertaining display is provided for these cards. On the other hand, in card 3 the player requested a discard and the intermediate hand shows a 4 of clubs. The final hand as determined by the game designer (and encoded in the play data) shows a 7 of spades for card three. The transition from the 4 of clubs to the 7 of spades is facilitated by the entertaining display shown in FIG. 4*d*. This marks the transition from the Hand 2 card as requested by the user back to the original of Hand 1 card.

The opposite situation is found for card 5, namely the player has designated card 5 as a Hold, whereas the game designer has designated it as a Discard. In this case, the transition between the 3 of clubs of the intermediate hand (the player-designated Hold) to the 9 of hearts of the final hand (the game-designated Discard) is facilitated by an intervening, entertaining display, indicated by the card E in FIG. 4*d*.

In this example, each of the five cards of each hand is shown in the same location on the display for each hand. Thus, card 1 of Hand 1 is replaced by card 1 of the intermediate hand and then by card 1 of the final hand. In the event the entertaining display is shown, e.g., card 5, card 5 of Hand 1 is replaced with card 5 of the intermediate hand, which is replaced by the entertaining display, which is in turn replaced by card 5 of the final hand, all in the same region of the display.

Figure 6A:
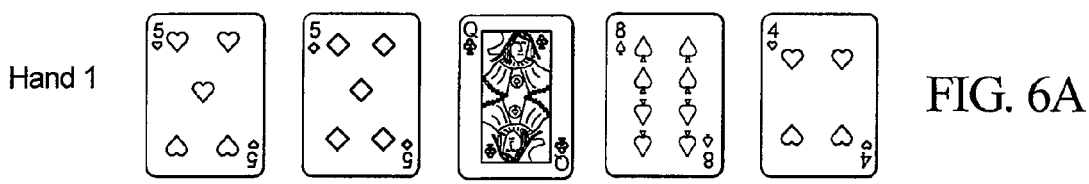
FIGS. 6a through 6e are schematic representations of displays generated by the system of FIG. 1 in response to the play data of FIG. 5.
Figure 6B:
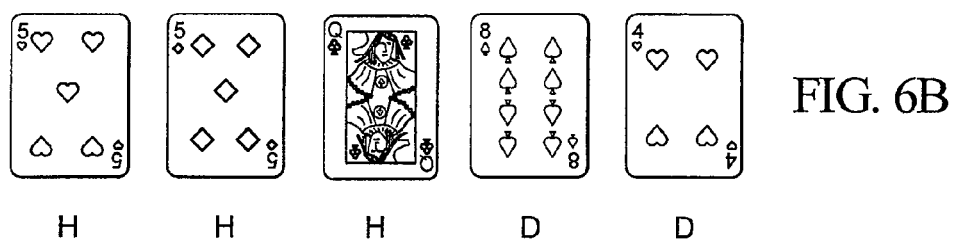
Figure 6C:
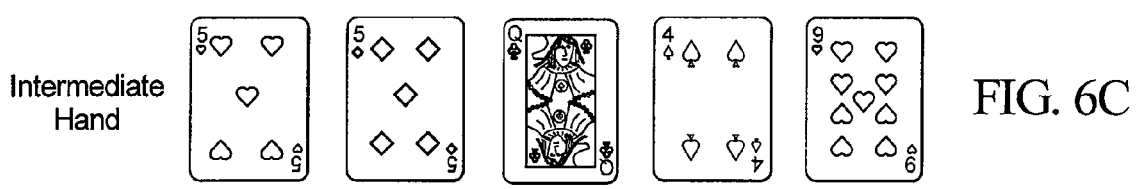
Figure 6D:
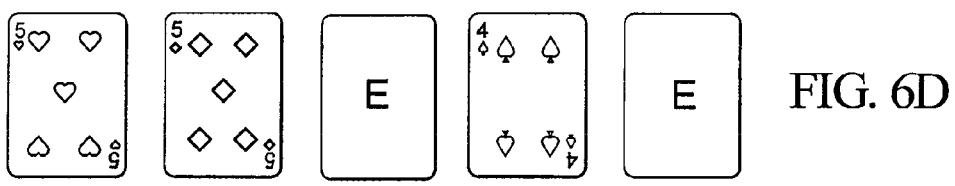
Figure 6E:
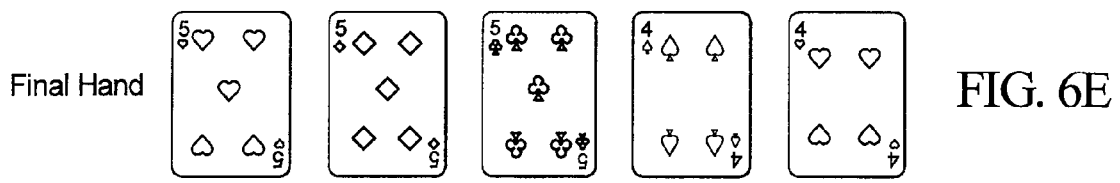

FIG. 5 shows a second example of play data, and FIGS. 6*a* through 6*e* show the corresponding displays generated by the system 10. In this case, Hand 1 (FIG. 6*a*) includes a pair of 5's and is thus a winning hand in a payout schedule in which a single pair or better is considered to be a winning hand. This payout schedule includes a respective payout for each winning hand. In this example, the player designates that cards 1, 2 and 3 are to be held, and that cards 4 and 5 are to be discarded (FIG. 6b). This results in the display of the intermediate hand shown in FIG. 6c. Note that cards 4 and 5 of the intermediate hand are taken from Hand 2 of the play data. As shown in FIG. 6d, an entertaining display is shown in the positions of cards 3 and 5, and then the final hand of FIG. 6e is shown. Note that the final hand includes a full house: three 5's and two 4's. As before, this final hand is determined by the game-specified designations of the play data, which require that cards 1, 2 and 5 be held (selected from Hand 1) and that cards 3 and 4 be discarded (selected from Hand 2). Note that the final hand is a better winning hand than the winning hand of Hand 1. That is, the full house of the final hand has a higher payout amount on the payout schedule than does the pair of 5's of the winning hand of Hand 1. This illustrates another feature of the simulated game of system 10, namely that a winning hand may be improved by the simulated play, and the payout actually received after the final hand has been shown may be greater than the payout associated with the initial hand, even when the initial hand is a winning hand.

Note that in the position of card 3 the entertaining display is interposed between a display of a held card and a drawn card, while in the position of card 5 the entertaining display is interposed between a display of a drawn card and the held card.

Of course, many changes and modifications can be made to the preferred embodiment described above. For example, in one alternative the intermediate hand discussed above is not displayed, and the flow of the game from the first hand, to the entertaining display when the player-specified designation is inconsistent with the game-specified designation, to the final hand. Also, depending upon the application, the game-specified designation can be limited to Hold and Discard, and may not include the Ignore state discussed above.

In the foregoing examples, the entertaining display is displayed in the same position as the corresponding cards of the intermediate and the final hand. In other embodiments, the entertaining display may overlap without precisely coinciding with a portion of the corresponding cards of the intermediate hand and/or the final hand. Additionally, the entertaining display may be displayed in a different position than any of the cards of the initial, intermediate, and final hands, or the entertaining display may occupy the entire display screen or the entertaining display may move around the display screen. Also, the initial hand, intermediate hand and final hand may be displayed in differing portions of the display.

The game that is simulated has been described as poker in the example of the drawings. The present invention is not limited to poker simulations, and many different card games can be simulated using the techniques described above, or modifications thereof. Blackjack and High-Low are two examples. Any desired payout schedule, and any desired definition of a winning hand, may be used. A payout schedule can take any form, including a lookup table or a parameter included in the play data.

As another alternative, it is not required that each hand include the same number of cards, and the final hand may include more or fewer cards than the initial hand.

Reel Game Embodiments

The embodiments described above may be adapted to display other types of games, such as reel games where one or more reels of symbols appear to spin and then come to rest at respective reel-stop positions. Each reel-stop position displays a respective reel symbol. In one embodiment, the reels are spun initially, and they come to rest displaying a first set of reel symbols. The player then selects a subset of the reel symbols to be discarded (i.e., the respective reels to be re-spun), and the selected reels are then re-spun. After the re-spin is completed, the entertaining display is shown for those reel symbols that must be changed to produce the final display of reel symbols.

All of the methods described above in conjunction with the finite poker embodiments may be used in reel-game embodiments, and any symbols may be used on the reels, including all of those that are conventionally used in reel-type games. In particular, the system and method of FIGS. 1, 2a, 2b and 2c can be modified by substituting the following terms to adapt them to a reel-type game:

| Card Game | Reel-Type Game |
|---|---|
| Card | Reel symbol |
| Initial deal | Initial spin |
| Deal | Re-spin |
| Hand 1 | First set of reel symbols |
| Hand 2 | Second set of reel symbols |
| Intermediate hand | Intermediate set of reel symbols |
| Final hand | Final set of reel symbols |

In this alternative, re-spinning a reel corresponds to a discard of the corresponding original reel symbol, and not re-spinning a reel corresponds to a hold of the corresponding original reel symbol.

The display of the first and final set of reel symbols can take many forms, including those shown in FIGS. 4a, 4e, 6a and 6e. If desired, various animation sequences may be shown to create the illusion of a spinning reel.

The various features of the systems and methods described above may be used separately from one another. Thus, the entertaining display may be used, whether or not a winning initial hand or set of reel symbols may be improved during simulated play, and vice versa. Also, these features may be applied to a wide variety of interactive finite-pool games with pre-determined outcomes, including card games, reel-type games, other lottery games such as simulated ticket games (e.g., scratch ticket and pull tab ticket games), and other casino-type games (e.g., roulette, money wheels, and dice games).

The term "playing symbol" is intended broadly to encompass symbols for a wide range of games, including symbols indicative of playing cards, reel symbols, interactive pull tab symbols, and other gaming devices. In general, playing symbols will be said to be "replaced" by a player when the player designates the playing symbol to be discarded, re-spun, or otherwise replaced in a given set of playing symbols.

The term "set" as used herein is intended to mean one or more, and the term "subset" is intended to mean zero or more members of a set.

The foregoing detailed description has discussed only a few of the many forms that this invention can take. For this reason, this detailed description is intended by way of illustration and not limitation. It is only the following claims, including all equivalents, that are intended to define the scope of this invention.

The invention is claimed as follows:

1. A gaming system comprising:
   at least one display device,
   at least one input device,
   at least one processor, and
   at least one memory device which stores a plurality of instructions, which when executed by the at least one processor, cause the at least one processor to operate with the at least one display device and the at least one input device, for a play of an interactive poker game, to:

(a) display a first plurality of playing cards to a player, said first plurality of playing cards corresponding to a first poker hand;
(b) enable the player to input at least one designation for the interactive poker game, wherein said designation is based on the displayed playing cards of the first poker hand;
(c) if the player's designation for the play of the interactive poker game is consistent with a predetermined designation associated with a predetermined game outcome:
   (i) display a second plurality of playing cards to the player, said second plurality of playing cards corresponding to a second poker hand which is associated with said predetermined game outcome, wherein said predetermined game outcome is either a winning game outcome or a losing game outcome, and
   (ii) provide said predetermined game outcome to the player; and
(d) if the player's designation for the play of the interactive poker game is inconsistent with the predetermined designation associated with said predetermined game outcome:
   (i) display a modification of at least one of the displayed playing cards, wherein independent of the player's designation, said modification causes the displayed playing cards to correspond to the predetermined game outcome, and
   (ii) provide said predetermined game outcome to the player.

2. The gaming system of claim 1, wherein said predetermined game outcome is associated with at least one playing card from said first plurality of playing cards.

3. The gaming system of claim 1, wherein said predetermined game outcome is associated with at least one playing card from said second plurality of playing cards.

4. The gaming system of claim 1, wherein said predetermined game outcome is associated with at least one playing card from said first plurality of playing cards and at least one playing card from said second plurality of playing cards.

5. The gaming system of claim 1, wherein the first plurality of playing cards has a different number of playing cards than the second plurality of playing cards.

6. The gaming system of claim 1, wherein said predetermined game outcome is obtained from a finite pool of game outcomes.

7. A gaming system comprising:
   at least one display device,
   at least one input device,
   at least one processor, and
   at least one memory device which stores a plurality of instructions, which when executed by the at least one processor, cause the at least one processor to operate with the at least one display device and the at least one input device, for a play of an interactive game, to:
   (a) display a first plurality of playing symbols to a player;
   (b) enable the player to input at least one designation for the interactive game, wherein said designation is based on the displayed first plurality of playing symbols;
   (c) if the player's designation is consistent with a predetermined designation associated with a predetermined game outcome:
      (i) display a second plurality of playing symbols associated with the predetermined game outcome, wherein said predetermined game outcome is either a winning game outcome or a losing game outcome, and
      (ii) provide said predetermined game outcome to the player; and
   (d) if the player's designation is inconsistent with the predetermined designation associated with said predetermined game outcome:
      (i) display a modification of at least one of the displayed playing symbols, wherein independent of the player's designation, said modification causes the playing symbols associated with said predetermined game outcome to be displayed, and
      (ii) providing said predetermined game outcome to the player.

8. The gaming system of claim 7, wherein said predetermined game outcome is associated with at least one playing symbol from said first plurality of playing symbols.

9. The gaming system of claim 7, wherein said predetermined game outcome is associated with at least one playing symbol from said second plurality of playing symbols.

10. The gaming system of claim 7, wherein said predetermined game outcome is associated with at least one playing symbol from said first plurality of playing symbols and at least one playing symbol from said second plurality of playing symbols.

11. The gaming system of claim 7, wherein each of the playing symbols represents a respective playing card.

12. The gaming system of claim 7, wherein each of the playing symbols represents a respective reel symbol.

13. The gaming system of claim 7, wherein the first plurality of playing symbols has a different number of playing symbols than the second plurality of playing symbols.

14. The gaming system of claim 7, wherein said predetermined game outcome is obtained from a finite pool of game outcomes.

15. A gaming system comprising:
   at least one display device,
   at least one input device,
   at least one processor, and
   at least one memory device which stores a plurality of instructions, which when executed by the at least one processor, cause the at least one processor to operate with the at least one display device and the at least one input device, for a play of an interactive game, to:
   (a) display information to a player, said information prompting a player to make at least one input for the interactive game;
   (b) enable the player to input a designation for the interactive game;
   (c) if the player's inputted designation is consistent with a predetermined designation associated with a predetermined game outcome, display and provide the predetermined game outcome to the player, wherein said predetermined game outcome is either a winning game outcome or a losing game outcome; and
   (d) if the player's inputted designation is inconsistent with the predetermined designation associated with said predetermined game outcome, display a modification of the displayed information, wherein independent of the player's designation, the predetermined game outcome is displayed and provided to the player.

16. The gaming system of claim 15, wherein said predetermined game outcome is obtained from a finite pool of game outcomes.

17. The gaming system of claim 16, wherein said finite pool of game outcomes is stored in the at least one memory device.

* * * * *